(12) United States Patent
Hoffmann et al.

(10) Patent No.: US 12,212,093 B2
(45) Date of Patent: Jan. 28, 2025

(54) ELECTRICALLY INSULATING TOUCH PROTECTION DEVICE AND CONNECTION ASSEMBLY WITH SUCH A TOUCH PROTECTION DEVICE

(71) Applicant: TE Connectivity Germany GmbH, Bensheim (DE)

(72) Inventors: Bjoern Hoffmann, Bensheim (DE); Alexander Weber, Bensheim (DE); Frank Kaehny, Bensheim (DE); Chris Buechling, Bensheim (DE); Marcus Wolf, Bensheim (DE); Manuel Eheim, Bensheim (DE); Patrick Distler, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 371 days.

(21) Appl. No.: 17/704,908

(22) Filed: Mar. 25, 2022

(65) Prior Publication Data

US 2022/0311172 A1    Sep. 29, 2022

(30) Foreign Application Priority Data

Mar. 26, 2021   (DE) .......................... 102021107713.3

(51) Int. Cl.
*H01R 13/516* (2006.01)
*H01R 13/512* (2006.01)

(52) U.S. Cl.
CPC ......... *H01R 13/516* (2013.01); *H01R 13/512* (2013.01)

(58) Field of Classification Search
CPC .......... G09F 9/3026; G09F 9/33; G09F 9/302; G06F 1/189; G06F 1/1601; H01R 13/2421; H01R 13/60; H01R 13/502; H01R 24/005; H05K 5/0018
USPC .......................................................... 439/153
See application file for complete search history.

(56) References Cited

U.S. PATENT DOCUMENTS

| | | | |
|---|---|---|---|
| 6,321,126 B1 * | 11/2001 | Kuzma ................ | A61N 1/3752 607/137 |
| 6,533,619 B2 | 3/2003 | Wakata et al. | |
| 10,218,111 B2 * | 2/2019 | Schüttler ................ | A61N 1/375 |
| 2003/0087476 A1 * | 5/2003 | Oohata ................... | H01L 24/82 438/455 |

(Continued)

FOREIGN PATENT DOCUMENTS

| | | |
|---|---|---|
| DE | 202019106641 U1 | 2/2020 |
| EP | 1401052 A1 | 3/2004 |

(Continued)

OTHER PUBLICATIONS

Germany's Office Action, Application No. 102021107713.3, Dated: Dec. 23, 2021, 6 pages.

(Continued)

*Primary Examiner* — Alexander Gilman
(74) *Attorney, Agent, or Firm* — Barley Snyder

(57) ABSTRACT

An electrically insulating touch protection device for an electrical conductor includes an insulating tube and a housing receiving an end of the electrical conductor. The housing has an end section pointing toward the insulating tube. The end section has a first segment and a second segment. The first segment is inserted into the insulating tube and the second segment is placed on the insulating tube.

17 Claims, 6 Drawing Sheets

(56) References Cited

U.S. PATENT DOCUMENTS

| | | | | |
|---|---|---|---|---|
| 2004/0228080 | A1* | 11/2004 | Hillman | F16M 11/2014 |
| | | | | 248/278.1 |
| 2005/0118887 | A1* | 6/2005 | Hoffer | H01R 13/5224 |
| | | | | 439/810 |
| 2013/0203284 | A1* | 8/2013 | Perotto | H05K 5/069 |
| | | | | 264/272.14 |
| 2017/0076837 | A1 | 3/2017 | Yanazawa et al. | |
| 2018/0006407 | A1* | 1/2018 | Sasaki | H01R 24/40 |
| 2018/0082615 | A1* | 3/2018 | Cheung | G09F 21/04 |
| 2018/0358824 | A1* | 12/2018 | Roberts | G06F 1/1632 |
| 2021/0166842 | A1* | 6/2021 | Hoffmann | H01R 13/506 |

FOREIGN PATENT DOCUMENTS

| | | |
|---|---|---|
| EP | 3419119 A1 | 12/2018 |
| EP | 3767750 A1 | 1/2021 |
| WO | 2011057798 A1 | 5/2011 |

OTHER PUBLICATIONS

Indian Office Action, Application No. 202244015683, Dated: Oct. 12, 2022, 5 pages.
Extended European Search Report, Application No. 22164599.7-1201, Aug. 19, 2022, 7 pages.
Office Action from Japan's Patent Office dated Mar. 28, 2023 with English translation, corresponding to Application No. 2022-046553, 13 pages.

* cited by examiner

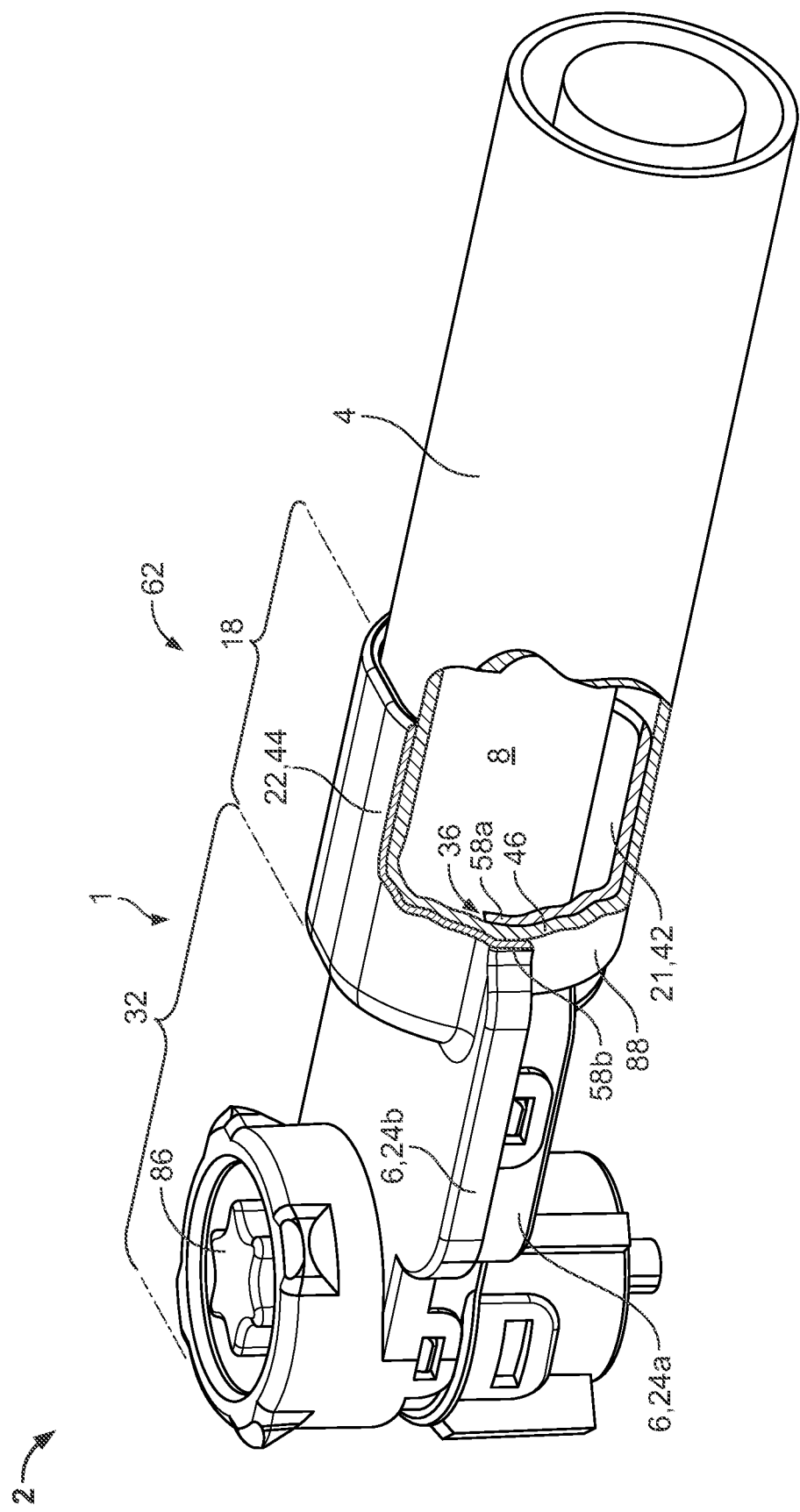

ELECTRICALLY INSULATING TOUCH PROTECTION DEVICE AND CONNECTION ASSEMBLY WITH SUCH A TOUCH PROTECTION DEVICE

CROSS-REFERENCE TO RELATED APPLICATIONS

This application claims the benefit of the filing date under 35 U.S.C. § 119(a)-(d) of German Patent Application No. 102021107713.3, filed on Mar. 26, 2021.

FIELD OF THE INVENTION

The present invention relates to an electrically insulating touch protection device for an end of an electrical conductor. The present invention also relates to a connection assembly with such a touch protection device.

BACKGROUND

For reasons of electrical safety, electrical conductors that connect electrical units, such as battery modules in automotive engineering and energy technology for the purpose of power transmission, are generally provided with a touch protection. For better manufacturability, the touch protection there often consists of several individual parts connected to one another. These individual parts each surround the electrical conductor in sections and are often plugged to, pressed into and/or otherwise connected to one another in an overlapping manner during the assembly of the touch protection. As explained hereafter, this is disadvantageous.

The overlap typically results in a blind assembly, which makes it difficult to verify the flawlessness of the connection immediately or indirectly after installation. For example, a touch protection, the individual parts of which have been plugged together incorrectly, in particular not completely, may remain undetected during an outgoing inspection. Furthermore, the flawless continuation of the connection cannot be verified beyond any doubt. During maintenance of the touch protection, it could possibly be overlooked that the individual parts of the touch protection have come loose in the course of use and are about to detach. Under certain circumstances, all of this may result in the failure of the touch protection and therefore represents a safety risk.

Accordingly, the present invention is based on the object of improving the safety of touch protection devices and connection assemblies.

SUMMARY

An electrically insulating touch protection device for an electrical conductor includes an insulating tube and a housing receiving an end of the electrical conductor. The housing has an end section pointing toward the insulating tube. The end section has a first segment and a second segment. The first segment is inserted into the insulating tube and the second segment is placed on the insulating tube.

BRIEF DESCRIPTION OF THE DRAWINGS

The invention will now be described by way of example with reference to the accompanying Figures, of which:

FIG. 6 is a partially sectional perspective view of the connection assembly from FIG. 5.

DETAILED DESCRIPTION OF THE EMBODIMENTS

Figure 1:
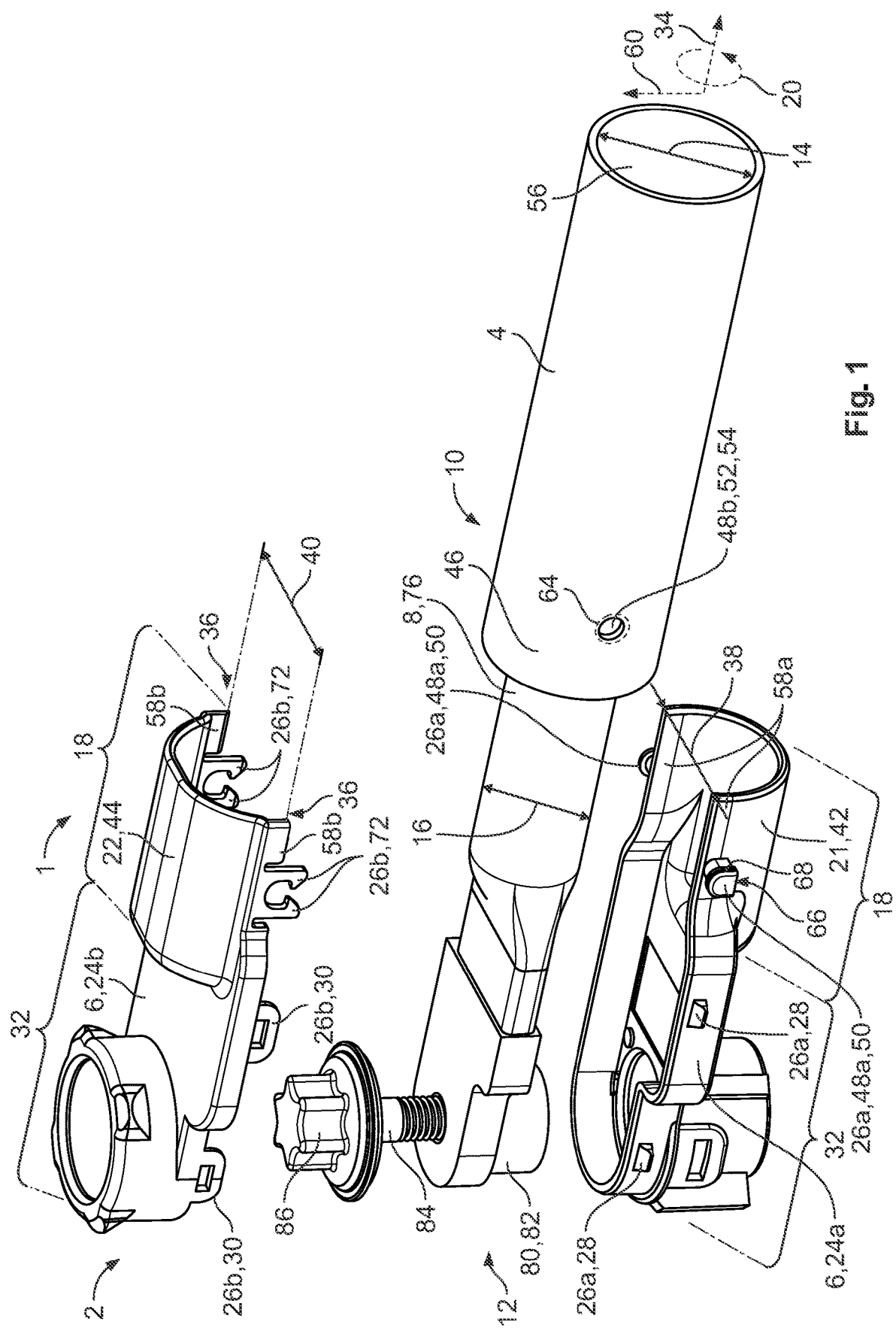
FIG. 1 is an exploded perspective view of a connection assembly with an electrical conductor and a touch protection device according to an exemplary embodiment.

The invention shall be explained hereafter in more detail with reference to the drawings on the basis of several embodiments, the different features of which may be combined with one another as required. Similar, identical, and functionally identical elements in the drawings are provided with the same reference numerals to the extent appropriate.

The schematic structure of a touch protection device 1 according to the invention and a connection assembly 2 according to the invention of an exemplary embodiment shall be described hereafter with reference to FIGS. 1 to 6.

As may be seen from FIG. 1, touch protection device 1 in the exemplary embodiment may comprise an insulating tube 4 and a housing 6. Connection assembly 2 in turn comprises touch protection device 1 and a preferably elongate electrical conductor 8.

Insulating tube 4 is configured separately so that it may be drawn onto electrical conductor 8. In particular, insulating tube 4 may be slipped over electrical conductor 8 from one end of electrical conductor 8. Insulating tube 4 may there receive electrical conductor 8 subject to play. In other words, an inner diameter 14 of insulating tube 4 is greater than or equal to an outer diameter 16 of electrical conductor 8. This is shown most clearly in FIG. 4. As a result, the insulating tube 4 and the electrical conductor 8 remain movable relative to one another for locally limited mechanical stress compensation motions. The resulting connection assembly 1 is then less rigid and is consequently easier to handle during installation.

Alternatively, insulating tube 4 may also receive electrical conductor 8 with an exact fit when inner diameter 14 of insulating tube 4 corresponds to outer diameter 16 of electrical conductor 8. Alternatively, insulating tube 4 and electrical conductor 8 may further be connected to one another by way of a force fit in that inner diameter 14 of insulating tube 4 is selected to be at least slightly smaller than outer diameter 16 of electrical conductor 8.

Insulating tube 4 and housing 6 are each made of electrically insulating materials. Insulating tube 4 is further optionally made of expandable elastic material, for example, silicone, at least at one end region 10 of insulating tube 4. In particular, entire insulating tube 4 may be made from this material as a soft component and may be stretchable compared to housing 6. Insulating tube 4 may optionally be configured to be heat-resistant. For this purpose, glass fiber mesh may be incorporated into the material of insulating tube 4.

Housing 6 is made of a material which is dimensionally stable at least in comparison to end region 10 of insulating tube 4. Furthermore, housing 6 is configured to receive end 12 of electrical conductor 8. In particular, end 12 of electrical conductor 8 may project from end region 10 of insulating tube 4 and be received in housing 6. For this purpose, housing 6 may comprise a receiving section 32 which surrounds end 12 of electrical conductor 8 in a shell-like manner (see FIG. 3).

As may also be seen from FIG. 1, housing 6 has a sleeve-shaped end section 18 in an embodiment pointing to insulating tube 4 and comprising a first segment 21 and a second segment 22 with respect to insulating tube 4 following first segment 21 in circumferential direction 20. End section 18 and receiving section 32 of housing 6 may be arranged with respect to insulating tube 4 next to one another in longitudinal direction 34 and be shaped to be monolithic.

First segment 21 may be inserted into insulating tube 4 and second segment 22 is configured such that it may be placed onto insulating tube 4. In other words, second segment 22 may be placed at the same time as first segment 21 is inserted or when first segment 21 has already been inserted into insulating tube 4.

First segment 21 and second segment 22 together form end section 18 of housing 6 and are each separated from one another by a gap 36 extending in longitudinal direction 34. Housing 6 comprises, for example, two gaps 36, where wall 46 of insulating tube 4 extends in circumferential direction 20 through one of two gaps 36 from outside housing 6 to the inside and through the other of two gaps 36 from inside housing 6 to the outside. Wall 46 of insulating tube 4 respectively is lead through between first segment 21 and second segment 22.

It is also conceivable that housing 6 comprises any even number of gaps that are distributed in circumferential direction 20 at end section 18 of housing 6 and each separate an even number of segments forming end section 18 of housing 6 from one another. Wall 46 of insulating tube 4 then alternately extends in circumferential direction 20 through one of the gaps from outside housing 6 to the inside and through the gap adjacent in circumferential direction 20 from inside housing 6 to the outside. In particular, insulating tube 4 is lead through between two adjacent segments in circumferential direction 20.

In the exemplary embodiment shown, housing 6 is formed from two housing halves 24a, 24b, where one of two housing halves 24a comprises first segment 21 and the other of two housing halves 24b comprises second segment 22. Furthermore, two housing halves 24a, 24b each together form end section 18 and receiving section 32 of housing 6.

First segment 21 continues receiving section 32 of first housing half 24a in a semitubular manner. Second segment 22 accordingly continues receiving section 32 of second housing half 24b in a semitubular manner, where an inner diameter 40 of second segment 22 is greater than an outer diameter 38 of first segment 21.

In particular, first segment 21 forms a circumferential segment 42 of end section 18 which surrounds electrical conductor 8 in part from the outside in circumferential direction 20 and is in turn surrounded on the outside by insulating tube 4. Second segment 22 forms a remaining segment 44 of end section 18 which surrounds insulating tube 4 at least in part from the outside. Remaining segment 44 there supplements circumferential segment 42 toward end section 18 of housing 6.

Housing halves 24a, 24b are configured to be joined. In the embodiment shown in FIG. 1, housing halves 24a, 24b each comprise jaw sections 58a, 58b which overlap in radial direction 60 when housing halves 24a, 24b are joined. Gaps 36 each run between jaw sections 58a, 58b.

Furthermore, housing halves 24a, 24b are each shown in FIG. 1 as separate components, but may also be connected to one another in a pivotable manner by way of a hinge. In addition, two housing halves 24a, 24b comprise latching elements 26a, 26b that are mutually complementary. In the exemplary embodiment shown, first housing half 24a comprises a plurality of latching tabs 28 as latching elements 26a. Second housing half 24b comprises latching windows 30 that are complementary thereto as latching elements 26b, into which latching tabs 28 hook in a latching manner (see FIG. 5). Alternatively or additionally, housing halves 24a, 24b may be screwed, adhesively bonded, and/or welded together.

As may also be seen from FIG. 1, end section 18 of housing 6 and insulating tube 4 each comprise mutually complementary positive-fit elements 48a, 48b for establishing a positive-fit connection. One of positive-fit elements 48a may be configured as a projection 50 and another of positive-fit elements 48a is configured as a receptacle 52 that is complementary to projection 50. Unlike the pin shape shown in FIG. 1, projection 50 may also be configured in the shape of a mandrel or a dome.

Positive-fit element 48b configured as a receptacle 52 is disposed on insulating tube 4, as shown in FIG. 1, in an embodiment in end region 10 of insulating tube 4, and is formed by a passage opening 52. Passage opening 54 extends as a circular hole from inside 56 of insulating tube 4 to the outside, which may prevent stress peaks. Optionally, passage opening 54 may correspond in its the cross section to the projection.

Positive-fit element 48a configured as a projection 50 is accordingly disposed on first segment 21 of end section 18 of housing 6. Projection 50 projects from first segment 21 perpendicular to longitudinal direction 34 in radial direction 60 and protrudes through passage opening 54 so that a relative displacement in longitudinal direction 34 between insulating tube 4 and first segment 21 is prevented (see FIGS. 4 and 5). In particular, projection 50 penetrates insulating tube 4 only once. A free end of the projection 50 is then visible from the outside. In particular, it may be verified by visual inspection in this manner whether the projection 50 in fact protrudes properly through the passage opening 54.

Positive-fit element 48a configured as a projection 50 may furthermore comprise a free end 66, where free end 66 comprises a latching bead 68. Latching bead 68 runs around free end 66 at least in sections and thereby gives projection 50 a mushroom-like shape.

Projection 50 may also serve as a latching element 26a on first housing half 24a. For this purpose, projection 50 may be configured to be flattened on a side facing away from second housing half 24b. This creates a bearing surface 70 for associated latching element 26b of second housing half 24b which is formed, for example, by a claw-shaped latching hook 72 or a pair of claw-shaped latching hooks 72 which, when housing halves 24a, 24b are joined, engage around free end 66 of projection 50 and latch onto bearing surface. 70 (see FIG. 5).

The pair of claw-shaped latching hooks 72 also fulfills a function of a radial lock which locks insulating tube 4 in radial direction 60 on first segment 21. In other words, the pair of claw-shaped latching hooks 72 prevents insulating tube 4 from being removed unintentionally in radial direction 60 from first segment 21. Latching bead 68 on free end 66 of projection 50 again advantageously prevents the pair of claw-shaped latching hooks 72 from unintentionally deflecting or slipping off in radial direction 60 and thereby additionally supports the radial lock.

Alternatively, the radial lock may also be implemented by a separate locking clip mounted on free end 66 of projection 50. In the mounted state, the locking clip may provide a stop surface that points towards insulating tube 4 and that is in particular larger than the cross-sectional area of passage opening 54 and thereby prevents insulating tube 4 from being removed from projection 50 over the locking clip.

As may be seen from FIG. 1, several pairs of positive-fit elements 48a, 48b may be arranged distributed over the circumference, in an embodiment uniformly, on end section 18 of housing 6 and on insulating tube 4. Pairs of positive-fit elements 48a, 48b may also be distributed with non-uniform spacing over the circumference as long as the angular distances between positive-fit elements 48a of housing 6 correspond to the angular distances between positive-fit elements 48b of insulating tube 4. In an embodiment, the length distances between the individual positive-fit elements 48a of the housing 6 may also correspond to the length distances between the individual positive-fit elements 48b of the insulating tube 4.

In the exemplary embodiment shown, two pairs of positive-fit elements 48a, 48b are disposed diametrically opposite one another. In particular, first housing half 24a comprises two projections 50 which project from first segment 21 in opposite directions. Accordingly, insulating tube 4 comprises two passage openings 54 which are arranged on radially oppositely disposed sides of insulating tube 4.

Each of the two projections 50 penetrates only one passage opening 54 of the insulating tube 4. In this embodiment, the insulating tube 4 may consequently not be removed from the housing 6 simply by sliding it. Instead, the insulating tube 4 must be widened at the end region 10 in order to be able to be removed from the housing 6. This reduces the likelihood of unintentional detachment of the insulating tube 4 from the housing 6.

In FIGS. 1 to 6, electrical conductor 8 is shown as a round conductor 76. In particular, electrical conductor 8 may be an electrically conductive braid 74 with a round cross-sectional area. However, the shape of electrical conductor 8 is not restricted thereto and may be adapted to the respective application.

In the exemplary embodiment shown, end 12 of electrical conductor 8 is configured as a battery contact 80. In other words, a contact element 82 is attached to end 12 of electrical conductor 8 and configured to be connected to a battery, in particular to a traction battery or a battery module of an electric vehicle.

To attach contact element 82 to the battery, connection assembly 2 comprises an attachment element, such as a screw 84. Screw 84 is optionally made of a metal material and may comprise an electrically insulating protective cap 86 which, together with touch protection device 1, prevents the electrically conductive components of connection assembly 2 from being touched unintentionally.

Figure 2:
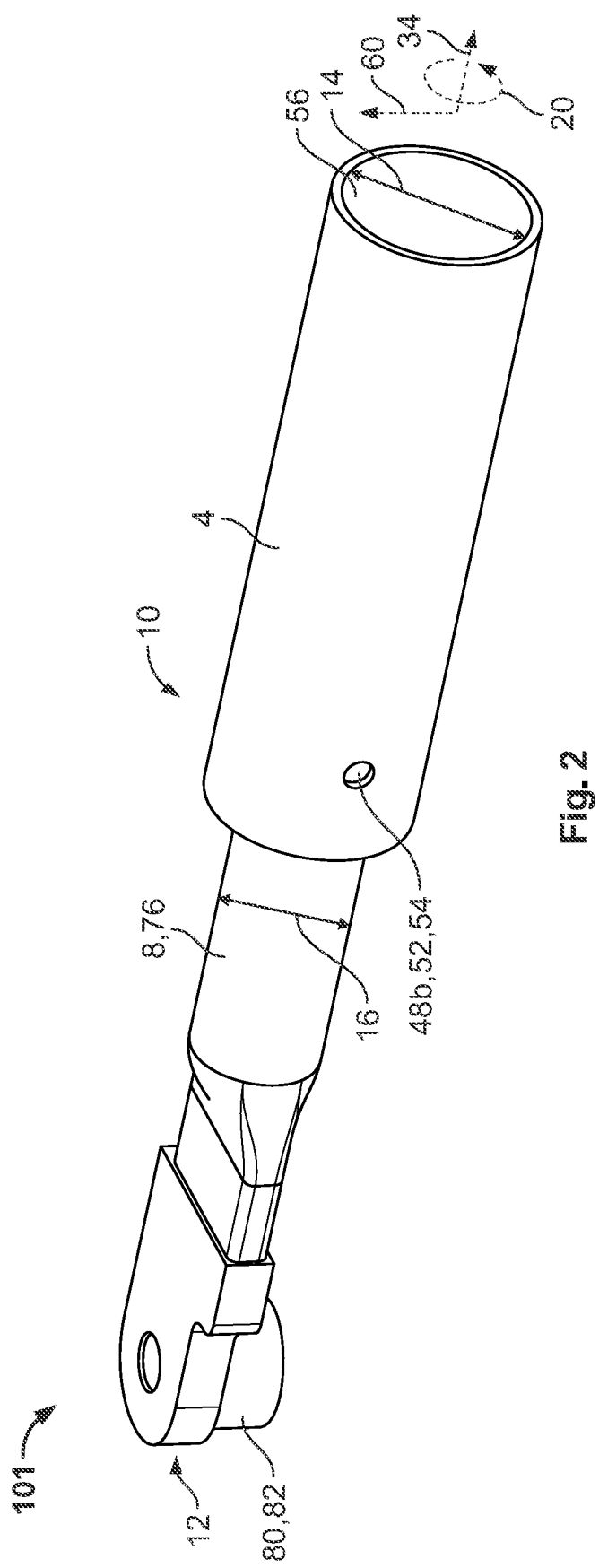
FIG. 2 is a perspective view of a first assembly step of the connection assembly from FIG. 1.

The assembly of the exemplary embodiment of the connecting arrangement 2 may be carried out as follows:

In a first assembly step 101, insulating tube 4 is drawn over end 12 of electrical conductor 8 onto electrical conductor 8 and positioned spaced from end 12 of electrical conductor 8 (see FIG. 2).

Figure 3:
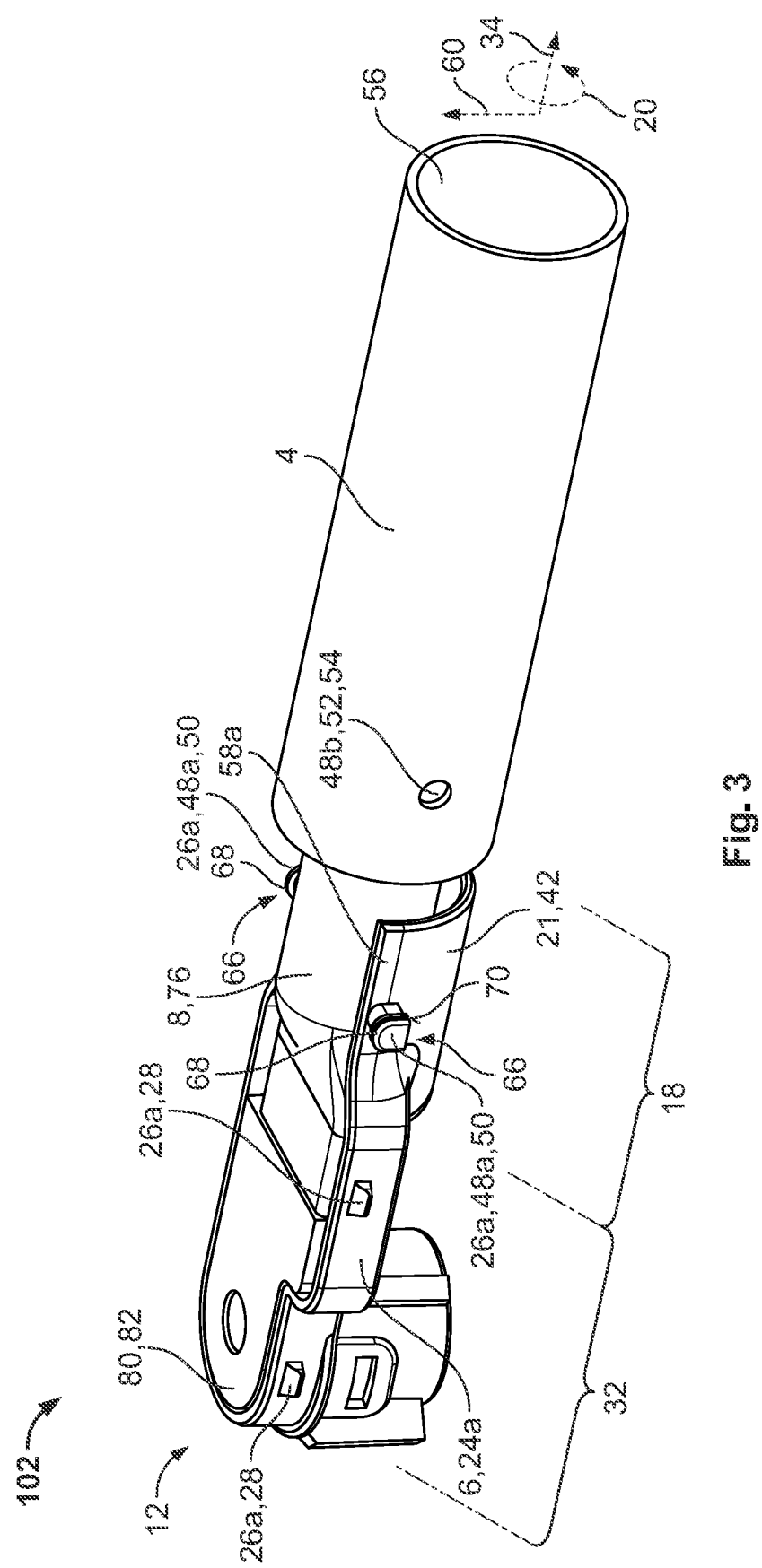
FIG. 3 is a perspective view of a second assembly step of the connection assembly from FIG. 1.

In a second assembly step 102, end 12 of electrical conductor 8 is placed into receiving section 32 of first housing half 24a (see FIG. 3). Alternatively, first housing half 24a may of course also be placed on end 12 of electrical conductor 8.

In a third assembly step 103, end region 10 of insulating tube 4 is widened, for example, manually or with a special tool, and drawn over first segment 21 of first housing half 24a. Alternatively, first segment 21 of first housing half 24a may also be inserted together with electrical conductor 8 into widened end region 10 of insulating tube 4. It is important there that positive-fit elements 48a, 48b are aligned in pairs. End region 10 of insulating tube 4 is then relaxed so that positive-fit elements 48a, 48b engage in pairs (see FIG. 4).

In a fourth assembly step 104, second housing half 24b is joined with first housing half 24a so that latching elements 26a, 26b latch into one another. In particular, second segment 22 is mounted on end region 10 of insulating tube 4, where part 88 of insulating tube 4 remains visible (see FIG. 5).

Free end 66 of projection 50 may optionally be chamfered. In other words, free end 66 may have a chamfer which is directed towards insulating tube 4 and contributes to end region 10 of insulating tube 4 expanding by itself in third assembly step 103 when first segment 21 is inserted.

Figure 4:
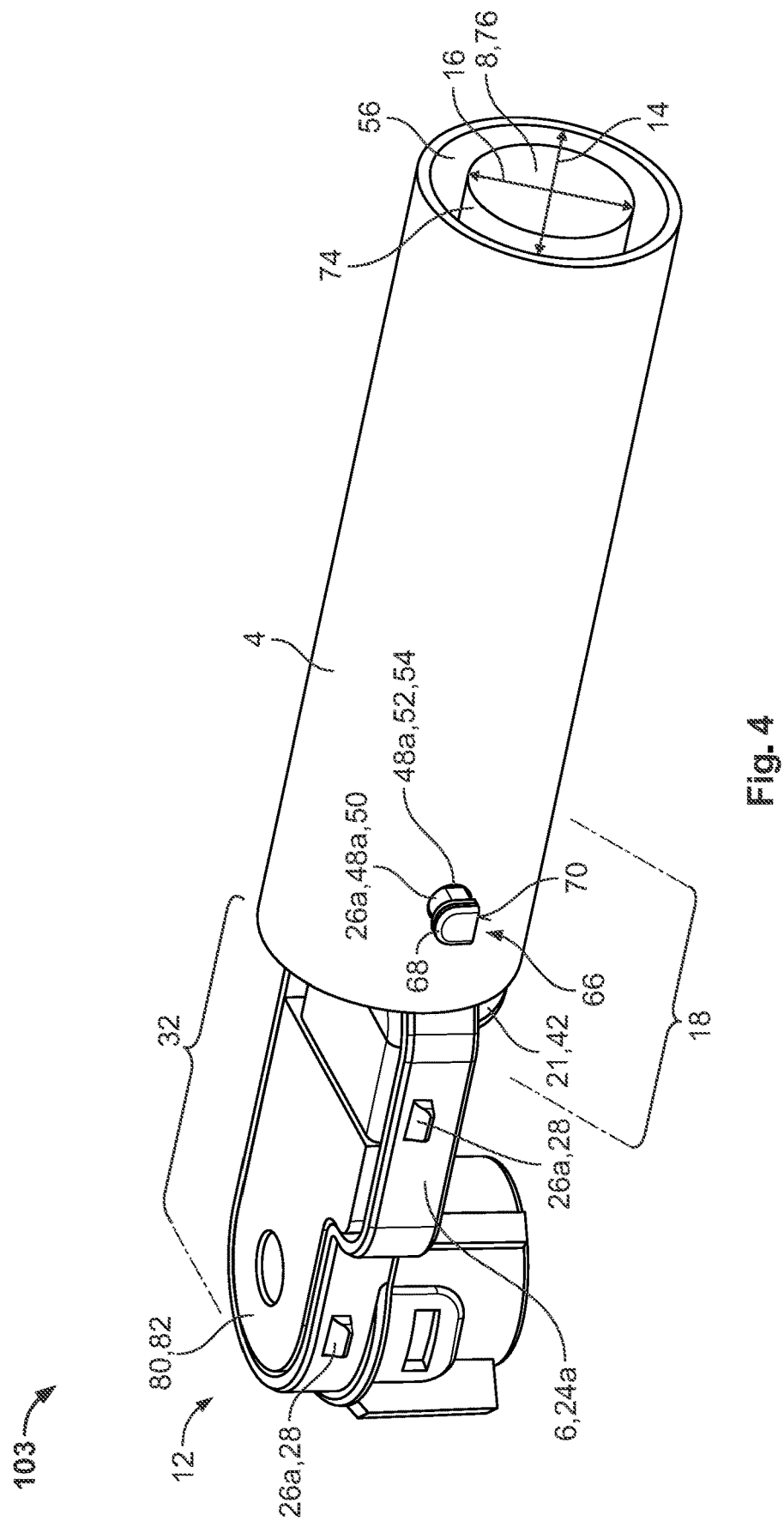
FIG. 4 is a perspective view of a third assembly step of the connection assembly from FIG. 1.
Figure 5:
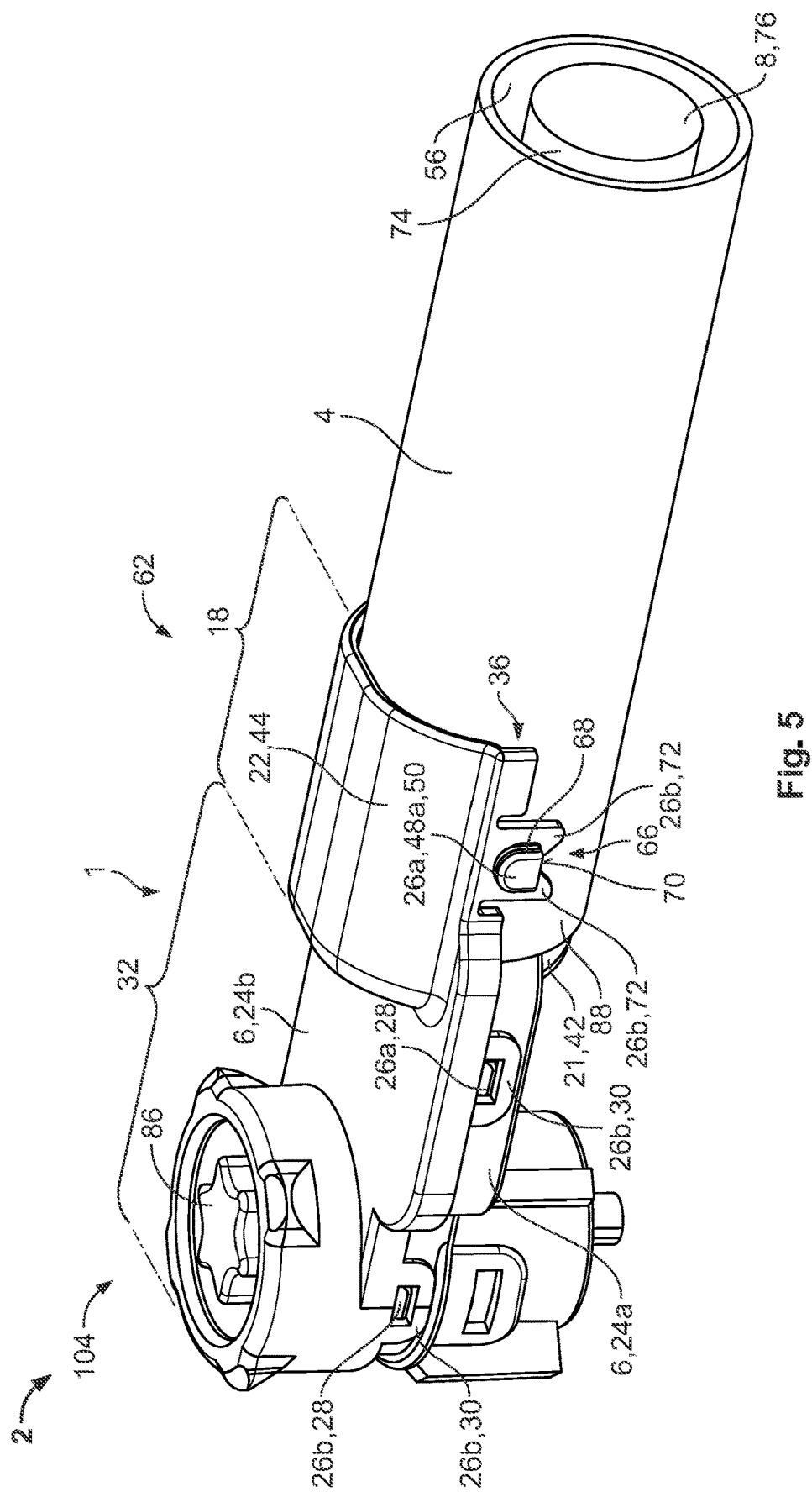
FIG. 5 is a perspective view of a fourth assembly step of the connection assembly from FIG. 1.

As a result of third assembly step 103 shown in FIG. 4, end region 10 of insulating tube 4 may optionally be stretched over first segment 21 of end section 18 so that first segment 21 and insulating tube 4 enter into a frictionally-engaged connection. Furthermore, insulating tube 4 may be pressed between first segment 21 and second segment 22 of end section 18. In particular, jaw sections 58a, 58b may press insulating tube 4 to create a further frictionally-engaged connection (see FIG. 6).

As an alternative embodiment not shown in the figures, it is also conceivable to manufacture housing 6 in one piece or integrally. As part of the assembly, first segment 21 would there be inserted in longitudinal direction 34 into insulating tube 4 and at the same time second segment 22 would be mounted onto insulating tube 4 in longitudinal direction 34 while wall 46 of insulating tube 4 would slide in a direction opposite to longitudinal direction 34 into gap 36.

For establishing the positive-fit connection already mentioned above, first segment 21 of housing 6 formed integrally may comprise pin-shaped projection 50, preferably on a side facing away from second segment 22. In particular, projection 50 may extend away from second segment 22 in radial direction 60. Passage opening 54 is accordingly formed on insulating tube 4.

As part of the assembly of this embodiment, insulating tube 4 and housing 6 may initially be aligned relative to one another in such a way that passage opening 54 and projection 50 are aligned in longitudinal direction 34. Insulating tube 4 on its side in longitudinal direction 34 which is aligned with projection 50 may subsequently be stretched on one side in radial direction 60 so that projection 50 does not hinder the insertion of first segment 21 into insulating tube 4. First segment 21 may then be inserted into insulating tube 4 until passage opening 54 is aligned with projection 54 in radial direction 60. Finally, insulating tube 4 with passage opening 54 may be mounted on projection 50 to thereby obtain the positive-fit connection.

In the embodiment with an integrally formed housing 6, the positive-fit connection between insulating tube 4 and housing 6 may optionally be locked with the locking clip already described above.

In addition or as an alternative to the positive-fit and frictionally-engaged connections already described, the connection assembly 2 may also comprise a further similarly configured housing which is arranged at the oppositely disposed other end of the electrical conductor. The insulating tube may be held between the housing and the further housing to lock it in position in the longitudinal direction.

The insulating tube 4 and the housing 6 may be connected and are suitable in the connected state to jointly surround the end of the electrical conductor 8 on all sides and protect against unintentional touching. The insulating tube 4 is further suitable to act as a touch protection for the remainder of the electrical conductor 8. By inserting and placing the end section 18 in segments, the insulating tube 4 remains visible in part from outside housing 6, in particular at the end section 18 of the housing 6. This enables visual monitoring to verify whether the insulating tube 4 and the housing 6 have been properly connected and whether this condition continues to exits, respectively. The risk of undetected incorrect assembly and/or failure is thus reduced so that the touch protection device 1 according to the invention provides increased level of safety.

What is claimed is:

1. An electrically insulating touch protection device for an electrical conductor, comprising:
   an insulating tube; and
   a housing receiving an end of the electrical conductor, the housing has an end section pointing toward the insulating tube, the end section has a first segment and a second segment, the first segment is inserted into the insulating tube and the second segment is placed on the insulating tube, the insulating tube is positioned around an outer surface of the first segment with the first segment between the insulating tube and the electrical conductor.

2. The electrically insulating touch protection device of claim 1, wherein the second segment has a radial lock that locks the insulating tube on the first segment.

3. The electrically insulating touch protection device of claim 1, wherein the insulating tube is made of an expandable material and is stretched over the first segment.

4. The electrically insulating touch protection device of claim 1, wherein the first segment and the second segment are separated from one another by a gap.

5. The electrically insulating touch protection device of claim 4, wherein the housing has a pair of gaps between the first segment and the second segment.

6. The electrically insulating touch protection device of claim 5, wherein the insulating tube extends through one of the gaps from outside the housing to inside the housing and through the other of the two gaps from inside the housing to outside the housing.

7. The electrically insulating touch protection device of claim 1, wherein the housing is formed from a pair of housing halves.

8. The electrically insulating touch protection device of claim 7, wherein one of the housing halves has the first segment and the other of the housing halves has the second segment.

9. The electrically insulating touch protection device of claim 8, wherein the housing halves have mutually complementary latching elements.

10. The electrically insulating touch protection device of claim 9, wherein at least one of the mutually complementary latching elements is arranged on the second segment and forms a radial lock that locks the insulating tube on the first segment.

11. The electrically insulating touch protection device of claim 1, wherein the end section of the housing and the insulating tube have mutually complementary positive-fit elements.

12. The electrically insulating touch protection device of claim 11, wherein a plurality of pairs of mutually complementary positive-fit elements are distributed on the end section of the housing and the insulating tube.

13. The electrically insulating touch protection device of claim 11, wherein one of the mutually complementary positive-fit elements is a projection and another of the mutually complementary positive-fit elements is a receptacle that receives the projection.

14. The electrically insulating touch protection device of claim 13, wherein the receptacle is disposed on the insulating tube and is a passage opening.

15. The electrically insulating touch protection device of claim 13, wherein the projection has a free end with a latching bead.

16. A connection assembly, comprising:
    an electrical conductor; and
    a touch protection device including an insulating tube and a housing formed of an electrically insulating material, the housing has an end section pointing toward the insulating tube, the end section has a first segment and a second segment, the first segment is inserted into the insulating tube and the second segment is placed on the insulating tube, an end of the electrical conductor is disposed in the insulating tube and in the housing, the insulating tube is positioned around an outer surface of the first segment with the first segment between the insulating tube and the electrical conductor.

17. The connection assembly of claim 16, wherein the end of the electrical conductor is a battery contact.

* * * * *